June 16, 1953   C. E. WILKEN   2,641,935
STAMPED METAL PULLEY AND MANUFACTURE THEREOF
Filed April 15, 1948   3 Sheets-Sheet 1
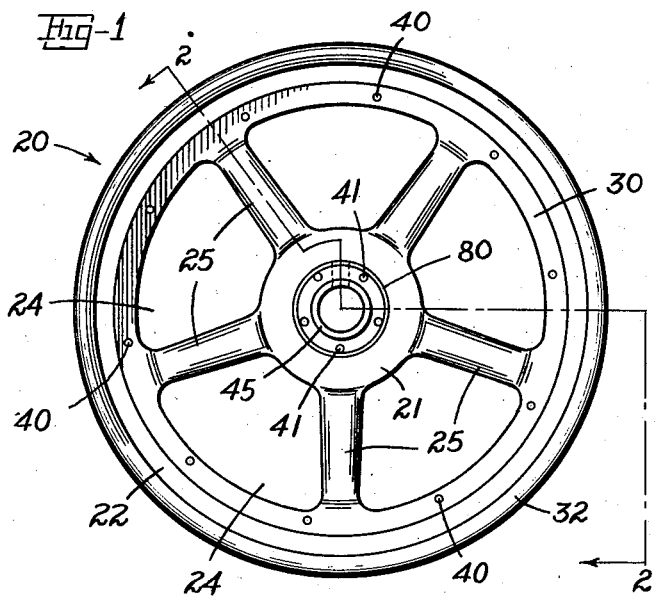
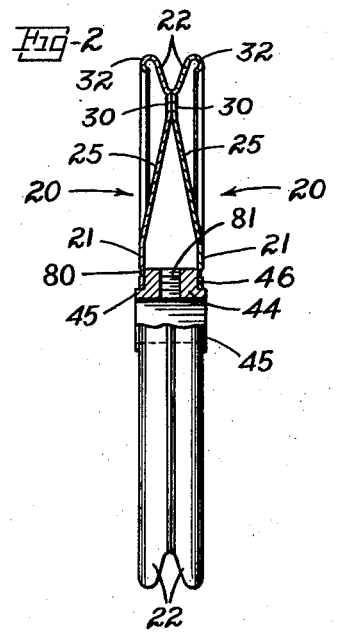
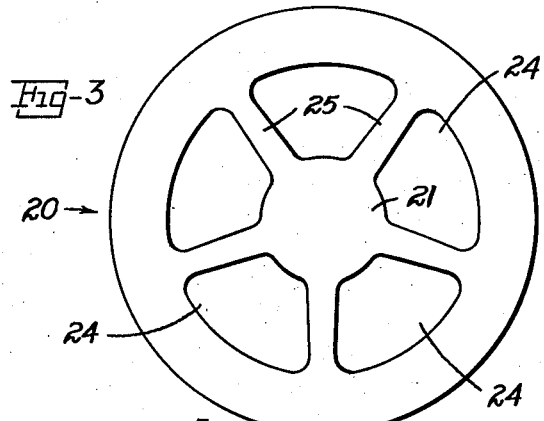
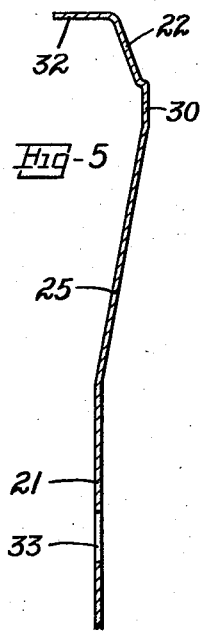
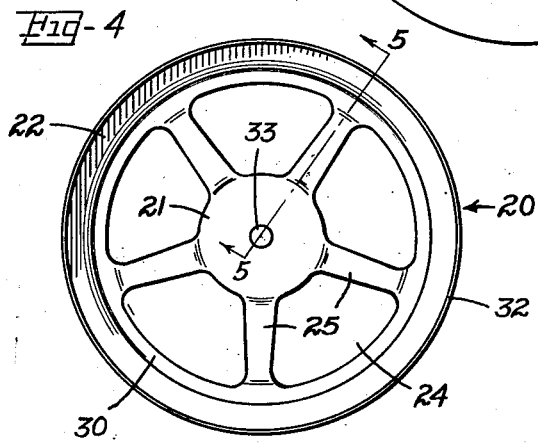
INVENTOR
Carl E. Wilken
BY
Marechal & Biebel
ATTORNEYS June 16, 1953 C. E. WILKEN 2,641,935
STAMPED METAL PULLEY AND MANUFACTURE THEREOF
Filed April 15, 1948 3 Sheets-Sheet 2
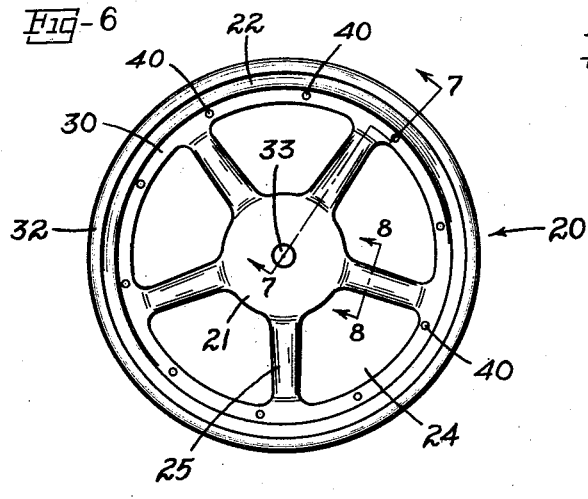
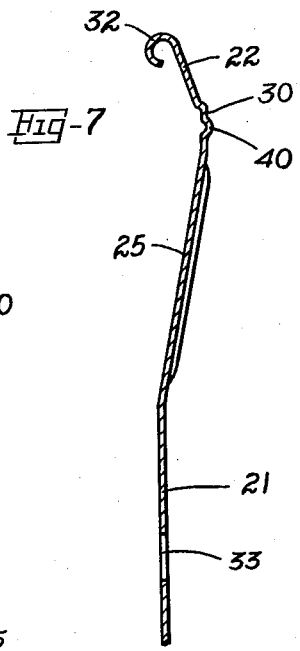
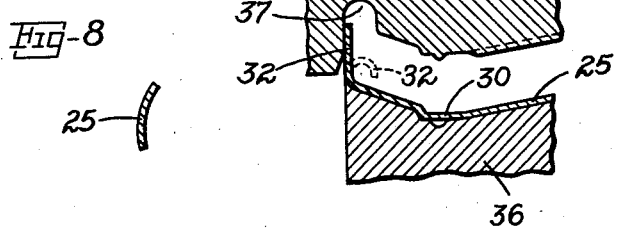
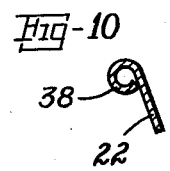
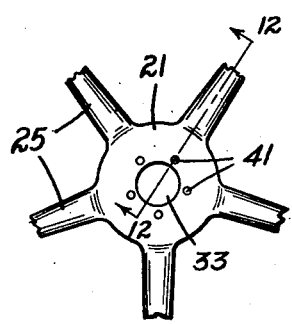
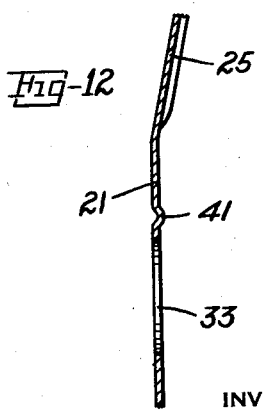
INVENTOR
Carl E. Wilken
BY
ATTORNEYS June 16, 1953 C. E. WILKEN 2,641,935
STAMPED METAL PULLEY AND MANUFACTURE THEREOF
Filed April 15, 1948 3 Sheets-Sheet 3
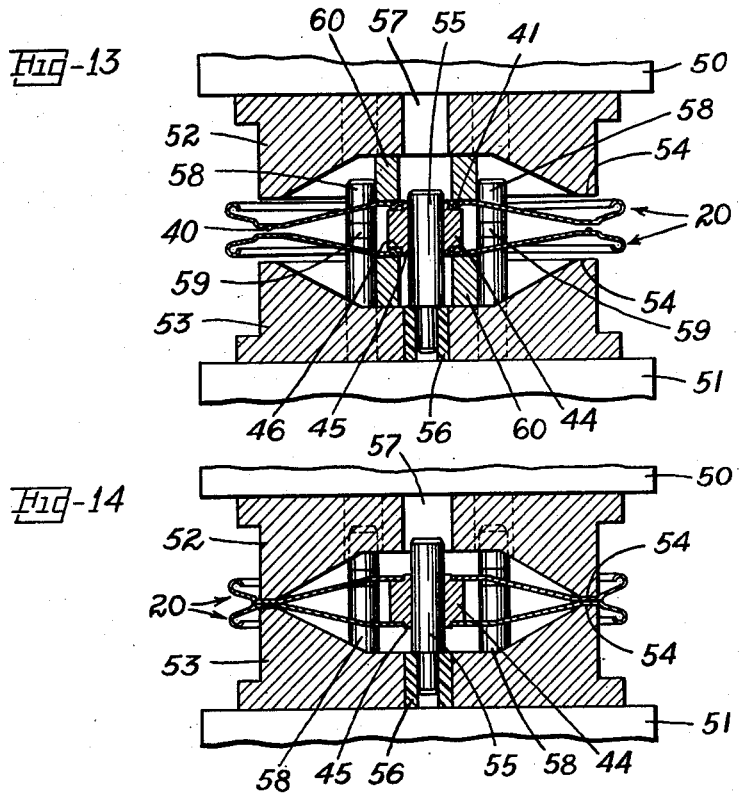
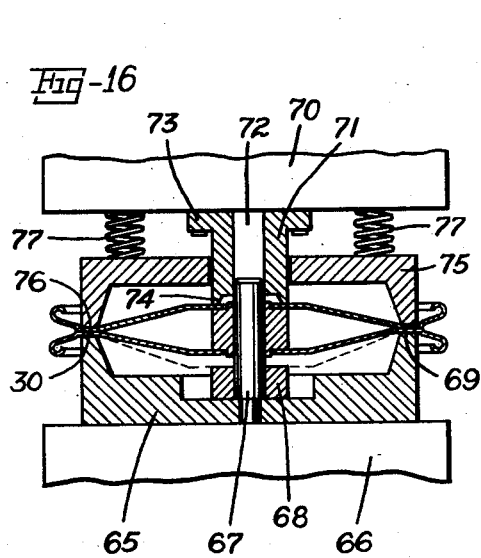
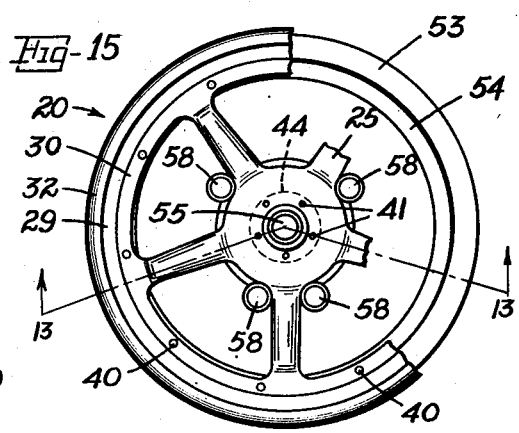
INVENTOR
Carl E. Wilken
BY Marechal & Biebel
ATTORNEYS Patented June 16, 1953

2,641,935

UNITED STATES PATENT OFFICE 2,641,935

STAMPED METAL PULLEY AND MANUFACTURE THEREOF

Carl E. Wilken, New Lebanon, Ohio, assignor to The Lau Blower Company, Dayton, Ohio, a corporation of Ohio Application April 15, 1948, Serial No. 21,187

5 Claims. (Cl. 74—230.8)

This invention relates to pulley wheels, and more particularly to the manufacture of pulley wheels from sheet metal.

One of the principal objects of the invention is to provide a pulley wheel of welded sheet metal construction which is light in weight and simple and economical to produce, which possesses high strength and rigidity, and which maintains proper balance and true alignment in operation.

Another object is to provide such a pulley wheel formed with a pair of stamped sheet metal disks which include integrally formed spoke portions extending from a central hub to the outer rim and which are secured together to form the completed wheel.

An additional object is to provide a simple and economical method of manufacturing pulley wheels in which the larger component parts of the wheel are stamped and formed from sheet metal and then welded together under controlled conditions which assure high strength, rigidity, proper balance and uniformity in the finished wheel.

It is also an object of the invention to provide for the manufacture of pulley wheels from sheet metal parts of such character and design that the same blanks may be employed to produce wheels fitting a substantial range of shaft and hub sizes by simple variation of the dies used in one forming step.

Other objects and advantages of the invention will be apparent from the following description, the accompanying drawings and the appended claims.

In the drawings—

Fig. 1 is a view in side elevation of a sheet metal pulley wheel in accordance with the present invention;

Fig. 2 is a view of the pulley wheel partly in elevation and partly in section as shown by the line 2—2 of Fig. 1;

Fig. 3 is an elevational view of one of the sheet metal blanks employed in producing the wheel;

Fig. 4 is an elevational view of the blank after the first forming step in the manufacturing operation;

Fig. 5 is a fragmentary section taken on the line 5—5 of Fig. 4 but on an enlarged scale;

Fig. 6 is a view similar to Fig. 4 after the next forming operation;

Fig. 7 is a sectional view on the line 7—7 of Fig. 6 but on an enlarged scale;

Fig. 8 is a detail section on the line 8—8 of Fig. 6 on a larger scale;

Fig. 9 is a fragmentary view showing the dies for performing the forming operation illustrated in Figs. 6 to 8;

Fig. 10 is a fragmentary view showing a modified construction of the outer rim of the wheel;

Fig. 11 is a fragmentary elevational view showing the inner portions of the blank after the next operation;

Fig. 12 is an enlarged fragmentary section on the line 12—12 of Fig. 11;

Fig. 13 is a view in vertical section on the line 13—13 of Fig. 15 illustrating the operation of welding the hub between a pair of disks in the formation of the wheel;

Fig. 14 is a view similar to Fig. 13 illustrating the operation of welding the outer portions of the wheel together;

Fig. 15 is a somewhat diagrammatic plan view illustrating the welding operation; and Fig. 16 is a view in vertical section illustrating the step of relieving stresses in the welded wheel.

The present invention has particular application to the manufacture of pulley wheels of the character employed with belts such as V-belts, and it provides a pulley wheel of this type which is of simple and strong but lightweight construction and which possesses material advantages in production and use. The pulley wheel of the invention is manufactured from a pair of stamped disk members blanked and formed from sheet metal stock by a series of simple stamping operations such as can be readily carried out on a punch press with dies of simple configuration. Each disk includes angularly spaced spoke portions integrally connecting the inner and outer annular portions of the disks, and these spokes are curved in cross-section for added rigidity in use. The two disks are welded together and to a central hub, and the invention provides for effecting such welding operations under controlled conditions promoting high strength and rigidity as well as proper balance and uniformity in the finished wheel.

The pulley wheels of the invention have been found fully comparable in strength, rigidity and freedom from slippage to pulleys of the same general type commonly used with V-belts such as cast iron, pressed steel or die cast pulleys. In addition, they offer substantial advantages over cast wheels in ease and economy of manufacture as well as in weight, a pulley produced from sheet steel in accordance with the present invention weighing only approximately 60% as much as a cast iron pulley of the same size. Moreover, the invention provides for the successful production and use of stamped pulley wheels having spokes integrally connecting the hub portion and the rim as distinguished from pulley wheels formed of imperforate disks, thus affording further savings in weight and stock without loss of strength or rigidity, as well as giving space for air flow through the wheel, which is particularly advantageous when such a pulley is employed on a drive shaft of a device such as a centrifugal blower or fan, the spaces between the spokes offering increased passage for intake air as compared with an imperforate disk-type pulley. In addition, this construction provides for enclosing the hub of the wheel within the disk portions so that two or more pulleys can be arranged on the same shaft to function as a multiple-groove pulley with the grooves thereof in the same relative spacing as in other pulleys having multiple grooves.

Referring to the drawings, which illustrate a preferred embodiment of the invention, the first step in the manufacturing operation is to stamp blanks from sheet stock, satisfactory results having been obtained with the use of relatively light gage sheet steel, such as 18-gage or with somewhat heavier gage for larger sizes and somewhat lighter gage for smaller sizes. Fig. 3 shows the configuration of a blank 20 from which one of the component disks of the wheel is formed, the blank including an inner or hub-forming portion 21 and an outer or rim portion 22. A plurality of angularly spaced apertures 24 are arranged to leave integral spoke portions 25 which connect the portions 21 and 22 of the disk.

Figs. 4 and 5 show the disk blank 20 after the first forming step, in which the spokes 25 are bent out of the blank of the sheet at a desired angle with respect to the portion 21, and the outer part of the rim portion 22 is flared in the opposite direction from the spokes. This leaves an annular band 30 intermediate the spokes and the flared portion 22 which is parallel to but axially offset from the inner portion 21 of the blank, and when the portions 30 of a pair of disks are arranged in juxtaposed relation, the portions 22 will form a belt-receiving groove. The angle of flare of the portion 22 is accordingly selected to fit a desired configuration of belt, an angle of the order of 18° for example having been found satisfactory with a pulley having a diameter of 8 inches.

In this same forming step illustrated by Figs. 4 and 5, the outermost part of the portion 22 is formed at right angles to the plane of the sheet to provide a flange 32 extending generally parallel to the axis of the disk, this being the first step in providing a rolled edge for the parts of the wheel which define the belt-receiving recess. Also during this forming step, a pilot hole 33 is pierced in the center of the blank, this hole being smaller in diameter than the shaft which the finished wheel is intended to fit and serving to locate the blank during subsequent manufacturing steps.

Figs. 6 to 10 illustrate the next forming step, which is shown as being performed by cooperating dies 35 and 36 (Fig. 9). The outer part of the upper die includes a groove 37 which rolls the flange 32 of the blank inwardly to complete the forming of a rolled edge for the disk portion 22. This edge may be left partly open as shown in Fig. 7 or rolled into contact with the outer surface of the portion 22 as shown at 38 in Fig. 10. The dies 35 and 36 are of such configuration as to curve each of the spokes 25 about an axis extending generally longitudinally thereof to present a convexly curved outer surface as shown in detail in Fig. 8. The dies 35 and 36 also form a series of welding dimples 40 in the portion 30 of the blank, and it will be noted in Fig. 6 that the dimples 40 are not symmetrically located with respect to the spokes so that when two disks are assembled for welding together, the dimples 40 will be interspaced with each other and will not be in direct contact.

Figs. 11 and 12 illustrate the configuration of the blank following the next manufacturing operation. In this step, the pilot hole 33 is enlarged in accordance with the size of the hub to be incorporated in the finished wheel. At the same time, a series of welding dimples 41 is formed in the inner disk portion 21, the radial location of these dimples being determined in accordance with the enlarged diameter of hole 33 and the dimensions of the proper hub.

Following the operation illustrated in Figs. 11 and 12, the disks are ready for assembly and welding to a hub 44, the configuration of which is shown in Fig. 2 and Figs. 13 to 16. The hub 44 is relieved at either end to provide pilot portions 45 which extend through the central apertures of the disks and which are surrounded by circumferential shoulder portions 46 which are adapted to abut the inner surfaces of the portions 21 of a pair of disks. As shown in Fig. 2, these pilot portions 45 of the hub are of slightly greater axial length than the thickness of the disks and extend axially beyond the portions 21 of the disks in the finished wheel.

This construction of hub member and the manufacturing procedure as described in connection with Figs. 3–12 provides for adapting different pairs of blanks of the same dimensions throughout the steps illustrated in Figs. 3 to 9 to form finished wheels fitting shafts of different sizes over a substantial range of diameters. Thus as pointed out, the enlarging of the center holes 33 of the disks and the location of the welding dimples 41 are controlled in accordance with a particular size of hub, the holes 33 being enlarged to the proper diameter to receive the pilot portions 45 of a given hub and the welding dimples 41 being located in accordance with the dimensions of the hub to engage the shoulder portions 46 of the hub. Thus for example, the same blanks have been used successfully to form 8-inch pulley wheels fitting shaft sizes ranging from ½ inch to 1½ inches in diameter. The only variation required is in the final size of the holes 33 and the location of the dimples 41, and such variation requires only the use of the proper one of selected pairs of dies for performing the operation illustrated in Figs. 11 and 12. Further economy of production is obtained by utilizing hubs having the same outer diameter and also the same diameter for the pilot portions 45 to fit shafts varying in diameter by as much as ¼ inch, thus reducing the number of pairs of dies for this manufacturing step required to fit the above total range of shaft sizes.

Figs. 13–15 illustrate the operation of welding a pair of disks 20 to a hub 45 in a press welder having a slide 50 and bolster plate 51 as shown fragmentarily in Fig. 14. Electrodes 52 and 53 are carried by the slide 50 and bolster plate 51, respectively, and these electrodes each have an inner, frusto-conical recess and an outer rim portion 54. A central guide pin 55 of the proper diameter for sliding fit in hub 44 is mounted in the center of the lower electrode 53 and insulated therefrom by a mounting sleeve 56 of insulating material, the upper end of pin 55 having clearance in the central base 57 of the upper electrode 52. The lower electrode 53 also carries a plurality of locating pins 58 for cooperation with the spokes 25 to align the disks 20 as shown in Fig. 15, the upper and lower portions of these pins being insulated from each other by insulating members 59.

The welding is carried out in two steps, in the first of which the inner portions 21 of the disks are welded to the shoulders 46 of the hub. In this step, annular collars 60 of copper are positioned above and below the assembled hub and disks and are held in position by the pin 55, the collars 60 being of sufficient axial dimensions to maintain the rim portions 54 of the electrodes out of contact with the disks. Also, in order to assure a strong weld, passage of welding current between the portions 30 of the disks is prevented by maintaining these portions out of electrical contact during this welding step. This result may be readily obtained in connection with the forming step illustrated in Figs. 4 and 5 by controlling the degree of inclination of the spokes 25 with respect to the disk portions 21 to an angle such that the relative offset between the portions 21 and 30 of each disk will be slightly less than the axial dimension of hub 44 between the shoulder portions 46 thereof.

The first welding step is carried out by causing the slide 50 to move downwardly and while the slide is down and the disks are held under pressure, welding current is applied through the electrodes and collars 60 to develop the desired welding heat and pressure between the dimples 41 and the hub portion 46. Fig. 13 shows the relative positions of the parts as this welding operation begins, and it will be noted that the rim portions 54 of the electrodes are maintained out of contact with the disks. Since the spaced relation of the outer portions of the disks will prevent the leakage of welding current therethrough, substantially all the current will pass through the dimples 41, thus assuring a strong weld between the hub and the inner portions of the disk.

The outer parts of the disk are then welded together as shown in Fig. 14. First the collars 60 are removed so that the hub parts of the wheel will be out of contact with the electrodes. The press welder is then actuated to cause the rim portions 54 of the electrodes to compress the dimples 40 and the portions 30 of the disks into contact, and welding heat and pressure is then developed between these contacting portions of the disks to complete the welding operation.

It is sometimes found that the welding steps tend to create stresses in the wheel which may result in an out of balance condition, and this condition is cured by relieving the stresses in the manner illustrated in Fig. 16. The wheel is mounted on an annular die 65 supported by the bolster plate 66 of a punch press and provided with a central locating pin 67 adapted to have sliding fit in hub 44. A collar 68 is mounted on pin 67, and the die 65 also includes a rim portion 69 which extends above the upper plane of collar 68 and is adapted to fit the portion 30 of the lower disk of the wheel and thus to support the wheel with its hub portion in vertically spaced and unsupported relation with collar 68.

The slide 70 of the press carries an anvil 71 having a central bore 72 to receive guide pin 68, the anvil being bolted to slide 70 by means of a flange portion 73. The lower end of anvil 71 has a frusto-conical recess provided with an annular rim portion 74 which is of such dimensions as to fit substantially directly between the ring of dimple marks 41 and the outer periphery of hub 44, anvils of different sizes being used in accordance with the size of the hub. The slide 70 also carries a die 75 similar in shape to die 65 and including a rim portion 76 of substantially the same dimensions as the rim portion 69 of die 65, the die 75 being supported from slide 70 by means of springs 77 to serve as a clamp.

When the press is operated as illustrated in Fig. 16, the wheel is first clamped between the rim portions 69 and 76 of dies 65 and 75, and the anvil 71 strikes the hub portion of the wheel and deflects the wheel downwardly, as indicated by the dotted lines, and into contact with the collar 68. The wheel is then turned over and the same operation repeated to strike a similar blow on the wheel in the opposite direction from the first blow, and it will then be found that such stresses as may previously have been present in the wheel are substantially relieved and eliminated.

This stress-relieving operation results to some extent in compressing the hub portion of the wheel between collar 68 and the rim portion 74 of anvil 71, and this also has a beneficial effect. Thus if hub 44 should not be in accurate alignment with both disks 20, this operation will tend to straighten out such inaccuracy so that the wheel will run true. Similarly if the inner surfaces of the disks are not in uniform contact with the portions 46 of the hub, they will be uniformly pressed into properly contacting position. This operation also has the effect of forming a shallow annular depression or groove in the outer surface of the portion 21 of each disk, as indicated at 80 in Figs. 1 and 2. In a wheel of the above size, this groove 80 is of the order of ⅛ inch in width and a few thousandths of an inch in depth, and it has the effect both of showing that the stress-relieving operation has been performed and also of imparting a more finished and decorative appearance to the wheel.

Figs. 1 and 2 show a complete pulley wheel following the operations described in connection with Figs. 3–16. The inner portions 21 of the two disks 20 are welded to the shoulders 46 of the hub as indicated by the row of dimple marks 41, and the portions 30 of the disks are similarly welded together as indicated by the outer row of dimple marks 40. The flaring rim portions 22 of the disks cooperate to form the belt-receiving groove, and the rolled edges 32 add strength and stiffness to this portion of the wheel as well as give a more finished appearance. This wheel can be readily secured to a shaft by means of a set screw in the tapped hole 81 in the hub, this hole being located between spokes 25 for ready access to a screw therein. This construction has the further advantage that with the hub thus enclosed between the disks, two or more wheels can be readily arranged on the same shaft in such close relationship as to function efficiently in conjunction with a cast driving pulley having multiple grooves, the relative spacing of the grooves of such plurality of the pulleys of the invention being substantially the same as the spacing of the grooves of a multiple-groove pulley of conventional construction.

It will thus be seen that the invention provides a stamped pulley wheel having material structural and operational advantages, as well as a simple and economical method of producing such a pulley wheel from sheet stock. All of the blanking and forming operations of the method are readily performed on a punch press and with dies of simple character. Furthermore, as already described, the majority of these dies can be used to produce wheels adapted to fit hubs and shafts of different sizes within a substantial range of shaft diameters, thus affording further economy in production. In addition, the assembly, welding and stress-relieving operations as described assure high strength and rigidity as well as proper balance and uniformity in the finished wheel.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. A pulley wheel of the character described comprising a pair of annular sheet metal disks each including a continuous peripheral rim portion and a plurality of angularly spaced spoke portions integrally connecting said rim portion with the central portion of said disk, a hub received between said central portions of said disks and welded thereto at a series of points intermediate the inner and outer peripheries of said hub, each of said disks having an annular depression in the outer surface thereof intermediate said series of welds and the outer periphery of said hub, said spokes of each said disk being inclined inwardly of said wheel with respect to the central portion of said disk to position the rim of said disk in axially offset relation with said central portion and in juxtaposition with the rim of the other said disk, said juxtaposed rims being welded together, said rims including oppositely flared peripheral portions cooperating to form a belt-receiving groove.

2. A pulley wheel of the character described comprising a pair of annular sheet metal disks each including a continuous peripheral rim portion and a plurality of angularly spaced spoke portions integrally connecting said rim portion with the central portion of said disk, a hub received between said central portions of said disks and welded together, said spokes of each said disk being inclined inwardly of said wheel with respect to the central portion of said disk to position the rim of said disk in axially offset relation with said central portion and in juxtaposition with the rim of the other said disk, each of said spokes being curved about an axis extending generally longitudinally thereof to present a convex outer surface, said juxtaposed rims being welded together, said rims including oppositely flared peripheral portions cooperating to form a belt-receiving groove.

3. A pulley wheel of the character described comprising a pair of annular sheet metal disks each including a continuous peripheral rim portion and a plurality of angularly spaced spoke portions integrally connecting said rim portion with the central portion of said disk, a hub received between said central portions of said disks and welded thereto at a series of spaced points intermediate the inner and outer peripheries of said hub, each of said disks having an annular depression in the outer surface thereof intermediate said series of welds and the outer periphery of said hub, said spokes of each said disk being inclined inwardly of said wheel with respect to the central portion of said disk to position the rim of said disk in axially offset relation with said central portion and in juxtaposition with the rim of the other said disk, each of said spokes being curved about an axis extending generally longitudinally thereof to present a convex outer surface, said juxtaposed rims being welded together, said rims including oppositely flared peripheral portions cooperating to form a belt-receiving groove.

4. The method of manufacturing a pulley wheel of the character described which comprises blanking from sheet metal a pair of disks each including inner and outer portions connected by angularly spaced integral spoke portions, forming said spokes to incline at an angle to the plane of said inner portion, forming said outer portions into rims cooperating to define a belt-receiving groove, forming welding dimples in said disks adjacent the outer ends of said spoke portions, punching a hole at the center of each of said disks to receive a pilot portion of a hub of predetermined size, forming welding dimples in each of said inner disk portions adjacent said hole therein, assembling said disks with said hub between said inner portions and with said spokes of each said disk inclining towards the other said disk, autogenously welding said hub to said disks by means of said dimples in said inner disk portion, then autogenously welding said outer portions of said disks together by means of said first named dimples, and finally relieving stresses in the resulting welded wheel by supporting said wheel from below adjacent rim portions and striking said hub from above on one side of said wheel and then on the other side thereof.

5. The method of manufacturing a pulley wheel of the character described which comprises blanking a pair of sheet metal disks each including inner and outer portions connected by angularly spaced integral spoke portions, forming said spoke portions to incline at an angle to said inner portions, forming said outer portions in the opposite direction from said spokes to define a belt-receiving groove, forming the outermost portion of each of said disks into a flange extending generally parallel to the axis of said disk, then rolling said flange inwardly to provide a smooth edge for said groove, forming each of said spokes about an axis extending lengthwise thereof to present a convexly curved outer surface, forming welding dimples in said outer portions of said disks, punching a hole at the center of each said disk to receive a pilot portion of a hub of predetermined size, forming welding dimples in each of said inner disk portions adjacent said hole therein, assembling said disks with said hub between said inner disk portions and with said spokes of each said disk inclining towards the other said disk to position said outer portions of said disks in juxtaposition, autogenously welding said hub between said inner disk portions by means of said dimples therein while maintaining said outer rim portions out of contact to prevent the passage of welding current therethrough, then autogenously welding said outer disk portions together by means of said dimples therein, and finally relieving stresses in the resulting welded wheel by supporting said wheel from below adjacent said rim portions and striking said hub from above first on one side of said wheel and then on the other side thereof.

CARL E. WILKEN.

References Cited in the file of this patent

UNITED STATES PATENTS

| Number | Name | Date |
|---|---|---|
| 355,294 | Beldsmeier | Jan. 4, 1887 |
| 355,555 | Radford | Jan. 4, 1887 |
| 659,648 | Chillingworth | Oct. 16, 1900 |
| 828,033 | Lachman | Aug. 7, 1906 |
| 904,540 | Lachman | Nov. 24, 1908 |
| 1,266,579 | Garcelon | May 21, 1918 |
| 1,310,246 | Moore | July 15, 1919 |
| 1,362,363 | Steenstrup | Dec. 14, 1920 |
| 1,395,734 | Root | Nov. 1, 1921 |
| 1,431,320 | Minnick | Oct. 10, 1922 |
| 1,497,337 | Loguin | June 10, 1924 |
| 1,700,004 | Watrous | Jan. 22, 1929 |
| 1,838,322 | Murray, Jr. | Dec. 29, 1931 |
| 2,279,816 | Eppler | Apr. 14, 1942 |
| 2,304,976 | Watter | Dec. 15, 1942 |

OTHER REFERENCES

Metals Handbook, 1948 Edition, published by the American Society for Metals, page 241. (Copy in Div. 14.)